United States Patent [19]
Siebert

[11] Patent Number: 5,367,375
[45] Date of Patent: Nov. 22, 1994

[54] SPATIAL WAVEFRONT EVALUATION BY INTENSITY RELATIONSHIP

[75] Inventor: Edward T. Siebert, New Fairfield, Conn.

[73] Assignee: Hughes Aircraft Company, Los Angeles, Calif.

[21] Appl. No.: 832,282

[22] Filed: Feb. 7, 1992

[51] Int. Cl.$^5$ .............................. G01B 9/02; G01J 1/00
[52] U.S. Cl. .................................. 356/345; 250/201.9; 356/121; 356/353
[58] Field of Search ......................... 356/345, 121, 353; 250/201.9

[56] References Cited

U.S. PATENT DOCUMENTS

| 4,309,602 | 1/1982 | Gonsalves et al. | 250/201.9 |
| 4,690,555 | 9/1987 | Ellerbroek | 356/121 |

OTHER PUBLICATIONS

N. Nakajima, J. Optical Soc. Amer., vol. A4, No. 1, Jan. 1987, p. 154.
M. Perez–Ilzarbe et al., J. Optical Soc. Amer. vol. A7, No. 3, Mar. 1990, p. 434.
R. Gonsalves, Proc. SPIE, vol. 351, Dec. 1982, p. 56.
J. Fienup et al., J. Optical Soc. Amer., vol. A7, No. 3, May 1990, p. 450.
J. Ohtsubo et al., Optical Eng., vol. 30, No. 9, Sep. 1991, p. 1332.

*Primary Examiner*—Stephen C. Buczinski
*Attorney, Agent, or Firm*—Michael W. Sales; Wanda K. Denson-Low

[57] ABSTRACT

A method, and apparatus for accomplishing the method, for determining a phase difference of a wavefront at a first (pupil) plane (P1), the wavefront propagating from the first plane to a second (image) plane (P2). The method includes the steps of providing an intensity of the wavefront at the first plane; measuring an intensity of the wavefront at the second plane; and determining the phase difference of the wavefront at the first plane in accordance with a transfer function that employs the provided intensity of the wavefront at the first plane and the measured intensity of the wavefront at the second plane. A single expression describing an Optical Transfer Function is developed and is shown to involve only the unknown aperture phase and known quantities. A solution to this expression, achieved by a polynomial expansion technique or by a sampling technique, is shown to yield the phase at the aperture and, together with the intensity at the aperture, to define the aperture wavefront.

15 Claims, 11 Drawing Sheets

$$B_n = \sum f_i \cdot f^*_{i-n} \qquad B_n = B^*_{-n}$$

$$B_0 = 1 + 1 + 1 + 1 + 1$$

$$B_{+1} = e^{j(\phi_{-1}-\phi_{-2})} + e^{j(\phi_0-\phi_{-1})} + e^{j(\phi_1-\phi_0)} + e^{j(\phi_2-\phi_1)}$$

$$B_{+2} = e^{j(\phi_0-\phi_{-2})} + e^{j(\phi_1-\phi_{-1})} + e^{j(\phi_2-\phi_0)}$$

$$B_{+3} = e^{j(\phi_1-\phi_{-2})} + e^{j(\phi_2-\phi_{-1})}$$

$$B_{+4} = e^{j(\phi_2-\phi_{-2})}$$

FIG. 6a.

DEFINE PHASE DIFFERENCES → EQUATIONS

ODD

$\phi_1 - \phi_{-1} = \Delta_1$ $\phi_2 - \phi_{-2} = \Delta_3$ $B_{+1} = 2e^{j\left(\frac{\Delta_3 - \Delta_1}{2}\right)} \cos \Delta_4 + 2e^{j\frac{\Delta_1}{2}} \cos \Delta_2$ $B_{+2} = 2e^{j\frac{\Delta_3}{2}} \cos(\Delta_2 + \ ) + 2e^{j\frac{\Delta_1}{2}} \cos \Delta_1$

EVEN

$\left(\frac{\phi_1 + \phi_{-1}}{2}\right) - \phi_1 = \Delta_2$ $\left(\frac{\phi_3 + \phi_{-3}}{2}\right) - \left(\frac{\phi_1 + \phi_{-1}}{2}\right) = \Delta_4$ $B_{+3} = 2e^{j\left(\frac{\Delta_3 + \Delta_1}{2}\right)} \cos \Delta_4$ $B_{+3} = 2e^{j\Delta_3}$

SOLUTION (MOD 2π)

ODD:

$B_{+4} = e^{j\Delta_3} \longrightarrow \Delta_3$ ;  $\dfrac{B_{+4} B_{+3}}{B_{+3}^*} = e^{j\Delta_1} \longrightarrow \Delta_1$

EVEN:

$\dfrac{B_{+1} - B_{+3}^* B_{+4}}{2e^{j\Delta_{1/2}}} = \cos \Delta_2 \longrightarrow \pm \Delta_2$ $\dfrac{B_{+2} - e^{j\Delta_1}}{2e^{j\Delta_{3/2}}} = \cos(\Delta_2 + \Delta_4) \longrightarrow \pm(\Delta_2 + \Delta_4)$ ;

$\dfrac{B_{+3}}{2e^{j\left(\frac{\Delta_1 + \Delta_3}{2}\right)}} = \cos \Delta_4 \longrightarrow \pm \Delta_4$

ROUND APERTURE OF DIAMETER 7 EMBEDDED IN A 7 X 7 SQUARE GRID

INTENSITY MAP

|       | 0.352 | 0.841 | 0.988 | 0.841 | 0.352 |       |
|-------|-------|-------|-------|-------|-------|-------|
| 0.352 | 0.999 | 1.0   | 1.0   | 1.0   | 0.999 | 0.352 |
| 0.841 | 1.0   | 1.0   | 1.0   | 1.0   | 1.0   | 1.841 |
| 0.988 | 1.0   | 1.0   | 1.0   | 1.0   | 1.0   | 1.988 |
| 0.841 | 1.0   | 1.0   | 1.0   | 1.0   | 1.0   | 1.841 |
| 0.352 | 0.999 | 1.0   | 1.0   | 1.0   | 0.999 | 0.352 |
|       | 0.352 | 0.841 | 0.988 | 0.841 | 0.352 |       |

PHASE MAP

|       | 0.100 | 0.740 | 0.320 | 0.350 | 0.870 |       |
|-------|-------|-------|-------|-------|-------|-------|
| 0.280 | 0.360 | 0.110 | 0.260 | 0.930 | 0.560 | 0.340 |
| 0.520 | 1.440 | 0.510 | 0.010 | 0.450 | 0.410 | 0.080 |
| 0.050 | 1.310 | 0.420 | 0.671 | 0.400 | 0.710 | 0.420 |
| 0.570 | 1.070 | 0.260 | 0.060 | 0.220 | 0.490 | 0,320 |
| 0.840 | 0.700 | 0.150 | 0.650 | 0.780 | 0.280 | 0.910 |
|       | 0.880 | 0.090 | 0.340 | 0.580 | 0.400 |       |

FIG.9.

SPATIAL WAVEFRONT EVALUATION BY INTENSITY RELATIONSHIP

FIELD OF THE INVENTION

This invention relates generally to the evaluation of a wavefront of a propagating signal.

BACKGROUND OF THE INVENTION

It is frequently desirable to determine the characteristics of a spatial phase profile of a wavefront. In optics, this phase (divided by 2) is referred to as an Optical Path Difference (OPD) map, or aberration function. A knowledge of the OPD is essential to determine how the wavefront will propagate or how well the wavefront can be imaged. However, in that phase cannot be measured directly, a problem of phase retrieval is presented.

A conventional phase retrieval method employs interferometry, in which two coherent wavefronts are brought together (interfered) and the resulting high frequency intensity variations, referred to as fringes, are analyzed to determine the phase. A similar interference effect occurs in propagation and imaging. Interference effects in images also produce fringes which are referred to as diffraction fringes or sidelobes. Several of the better known properties of interferometry include the following. First, only phase differences can be determined and not the absolute phase. Second, for a single static interferogram, a sign ambiguity exists.

Some lesser known, but equally important properties of interferometry include the following. First, only intensities are measured. Phase cannot be measured directly, which is a result of a fundamental tenet of quantum mechanics regarding "observables". The phase is computed from intensity patterns or fringes which are recorded on film or by optical detectors. Second, and as a result of the immediately preceding property, it is an implicit assumption of interferometry that the amplitude of the two beams is constant, or at least slowly varying compared to the fringes, or is explicitly known so that the phase can be computed. This is required so that intensity variations, due to phase, can be differentiated from intensity variations due to amplitude. Similar constraints occur in microwave and FM systems. Third, adequate sampling of the fringes requires at least two samples per cycle.

An overview is now presented of the basic types of interferometers that provide phase retrieval from images.

An early type of interferometer is the Michaelson, in which an input beam is split into two parts, one of which is a reference and the other of which samples a surface under test. The two beams are recombined to form an interferogram which allows the phase difference between the surface under test and the reference beam to be computed. Multiple beam interferometers may be used instead of a Michaelson-type to obtain sharper fringes. However, in all cases the general approach is the same: the beam (or beams) from the surface under test is compared to a reference beam (or beams) and the phase is inferred from the resulting fringes.

A problem that arises during the use of a Michaelson (or similar interferometer) is a requirement for high stability between the two optical paths and a requirement that no unknown errors exist in the interferometer optics or reference.

Another common type of interferometer is the shearing interferometer, wherein the reference is the surface under test which is shifted in position. The shift may be generated by a shear plate or by other means. A significant difference between the shearing interferometer and the Michaelson interferometer is that the surface is compared with itself (instead of a reference) and spatial phase differences are obtained. For small shifts, the phase shifts from a shearing interferometer are summed to reconstruct the original wavefront phase. This type of interferometer is less sensitive to mechanical stability than is the Michaelson, but places more constraints on the quality and coherence of the source beam.

Although not usually referred to as interferometry, another form of interferometry is imaging or, more generally, propagation. Propagation processes are governed by the laws of diffraction. Although diffraction and interferometry and not generally associated, it has been found that diffraction results from the interference of light "scattered" from the edges of an aperture with the light transmitted through the aperture. The resulting interference fringes, usually called diffraction sidelobes or fringes, are a function of the aperture function, such as size and shape, and the distance of the fringes from the aperture as well as aberration in the aperture. In propagating a wavefront, light from all parts of the aperture is summed together (interfered) to calculate the propagated wavefront. This is similar to a shearing interferometer in which the wavefront is interfered with itself, as displaced. Under certain circumstances the phase in the aperture can be estimated from a measurement of an image.

Conventional wavefront phase retrieval methods from propagation or imaging are iterative, successive approximation approaches. These approaches are generally inaccurate and may not necessarily converge to a correct solution due to the existence of secondary maxima. When these conventional methods do converge, convergence is frequently very slow. In interferometry, significant amounts of hardware may be required to accomplish wavefront phase retrieval. The provision of additional hardware is especially disadvantageous in airborne and spaceborne applications, where size and weight are important factors.

It is thus an object of the invention to employ a measurement of an image to determine aberrations, thus eliminating a need for the hardware associated with interferometric apparatus and the stability requirements of maintaining optical alignments to a fraction of a wavelength.

It is a further object of the invention to provide method and apparatus for accomplishing Spatial Wavefront Evaluation by Intensity Relationships (SWEBIR).

SUMMARY OF THE INVENTION

The foregoing and other problems are overcome and the objects of the invention are realized by method and apparatus for determining a phase of a wavefront from a measurement of intensity. The method operates in a rapid and exact manner without requiring the use of approximations. The teaching of the invention may be applied to a large number of applications including, but not limited to, optical, radar, sonar, electron microscopy, and x-ray systems. The method of the invention is rigorous, exact, fast, and any sign ambiguities are easily resolved. Given correct numerical inputs, the method yields results accurate to the computational accuracy of a data processor employed to perform the method.

More specifically, the invention teaches a method, and apparatus for accomplishing the method, for determining a phase profile of a wavefront at a first plane, the wavefront propagating from the first plane to a second plane. The method includes the steps of providing an intensity of the wavefront at the first plane; measuring an intensity of the wavefront at the second plane; and determining the phase difference of the wavefront at the first plane in accordance with a transfer function that employs the provided intensity of the wavefront at the first plane and the measured intensity of the wavefront at the second plane.

A single expression describing an Optical Transfer Function is developed and is shown to involve only (a) unknown aperture phase and (b) known quantities. The solution to this expression, achieved by a polynomial expansion technique or by a sampling technique, is shown to yield the phase at the aperture and, together with the intensity at the aperture, to define the aperture wavefront.

BRIEF DESCRIPTION OF THE DRAWING

The above set forth and other features of the invention are made more apparent in the ensuing Detailed Description of the Invention when read in conjunction with the attached Drawing, wherein:

FIGS. 1a-1c illustrate an example of diffraction interferometry wherein

DETAILED DESCRIPTION OF THE INVENTION

Figure 1A:
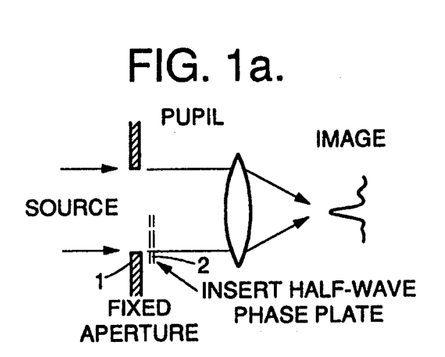
FIG. 1a shows a relationship between a pupil plane and an image plane.
Figure 1B:
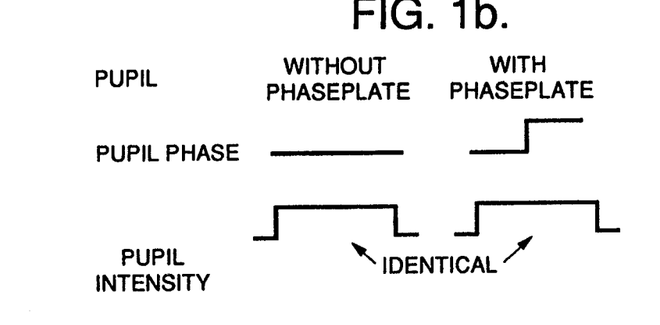
FIG. 1b shows the pupil phase and intensity.
Figure 1C:
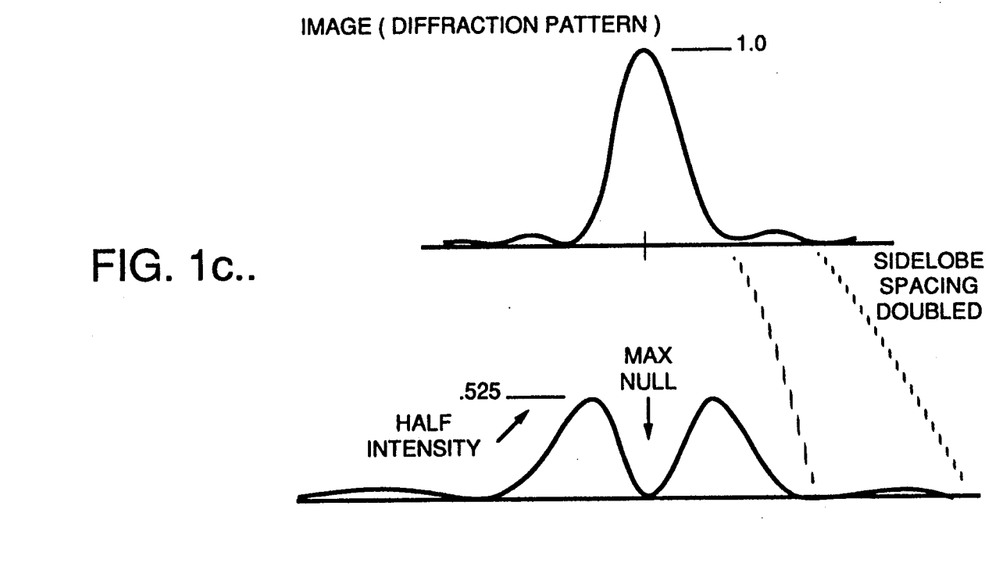
FIG. 1c shows a diffraction pattern formed at the image plane with and without the insertion of a phaseplate at the pupil plane.

In accordance with the invention, and by way of introduction, it can readily be shown that diffraction is actually a form of interferometry. Reference is made to FIG. 1a, which illustrates an experiment wherein the intensity in an aperture 1, or pupil, is kept constant but the phase is changed over part of the aperture 1 by the use of a half-wave phase plate 2 (FIG. 1b). As can be seen in FIG. 1c, very different diffraction patterns result for the case without the phase plate 2 (A) and with the phase plate 2 (B).

The invention is based upon a realization that, since different phase profiles (having the same intensity) result in different diffraction patterns, a reversal of this phenomenon enables the phase to be inferred from the diffraction pattern. The technique of the invention is thus aptly referred to as Spatial Wavefront Evaluation by Intensity Relationships (SWEBIR).

It is noted that SWEBIR requires no additional hardware to produce interference, in that the interferometry results from the propagation itself. Furthermore, SWEBIR is the less sensitive than the conventional interferometric techniques referred to above in so far as mechanical stability is concerned, in that SWEBIR does not require additional optical components and thus does not introduce additional possible error sources. Furthermore, source coherence requirements are minimized and are equivalent to that of an equal path interferometer. Source quality is similar to that required in a conventional shearing interferometer.

Having thus introduced the SWEBIR technique, a detailed description of same is now provided.

As was previously discussed, propagation or imaging can be regarded as a type of interferometry. In conventional interferometers, a relatively simple algorithm is available for computing phase from intensity. That is, assuming constant intensity, the intensity (I) is given by:

$$I = I_0[1 + \cos(\phi - \phi_R)].$$

From this relationship, the cosine of the phase difference can be computed and, therefore, the phase difference (with a $\pm \pi$ ambiguity). In a non-conventional propagation or imaging type of diffraction interferometry, the relationship between intensity and phase is more complicated. However, a defined relationship does exist.

The SWEBIR technique of the invention employs two basic assumptions:

1. the pupil and image intensities are related to one another in a manner that involves phase, as was shown in FIG. 1; and
2. this relationship can be inverted to determine the phase aberrations in the pupil from a knowledge of the pupil and image intensities.

To more fully describe the SWEBIR technique there is first defined the relationship between pupil phase and image intensity. Then, there are described presently preferred methods for employing these intensities so as to determine the phase and, hence, the aberrations of the pupil.

Pupil-Image Relationships

Figure 2A:
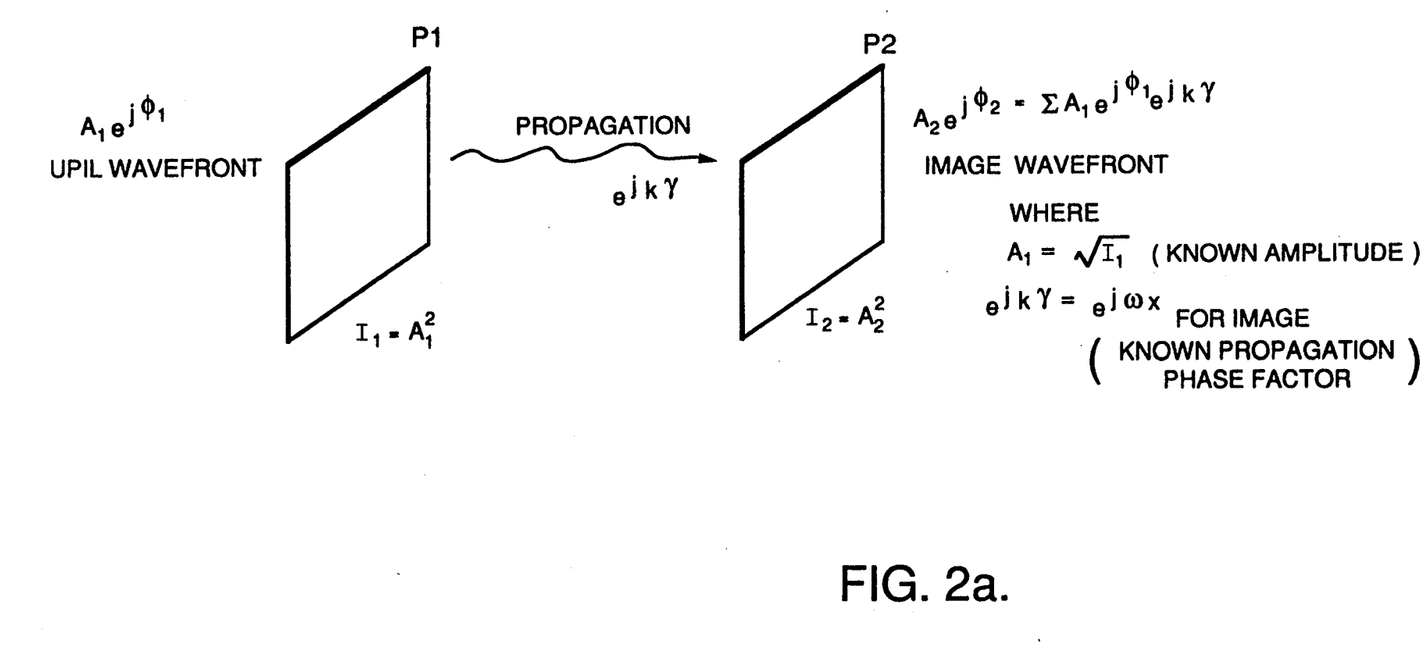
FIG. 2a shows a relationship due to propagation between a pupil wavefront and an image wavefront.
Figure 2B:
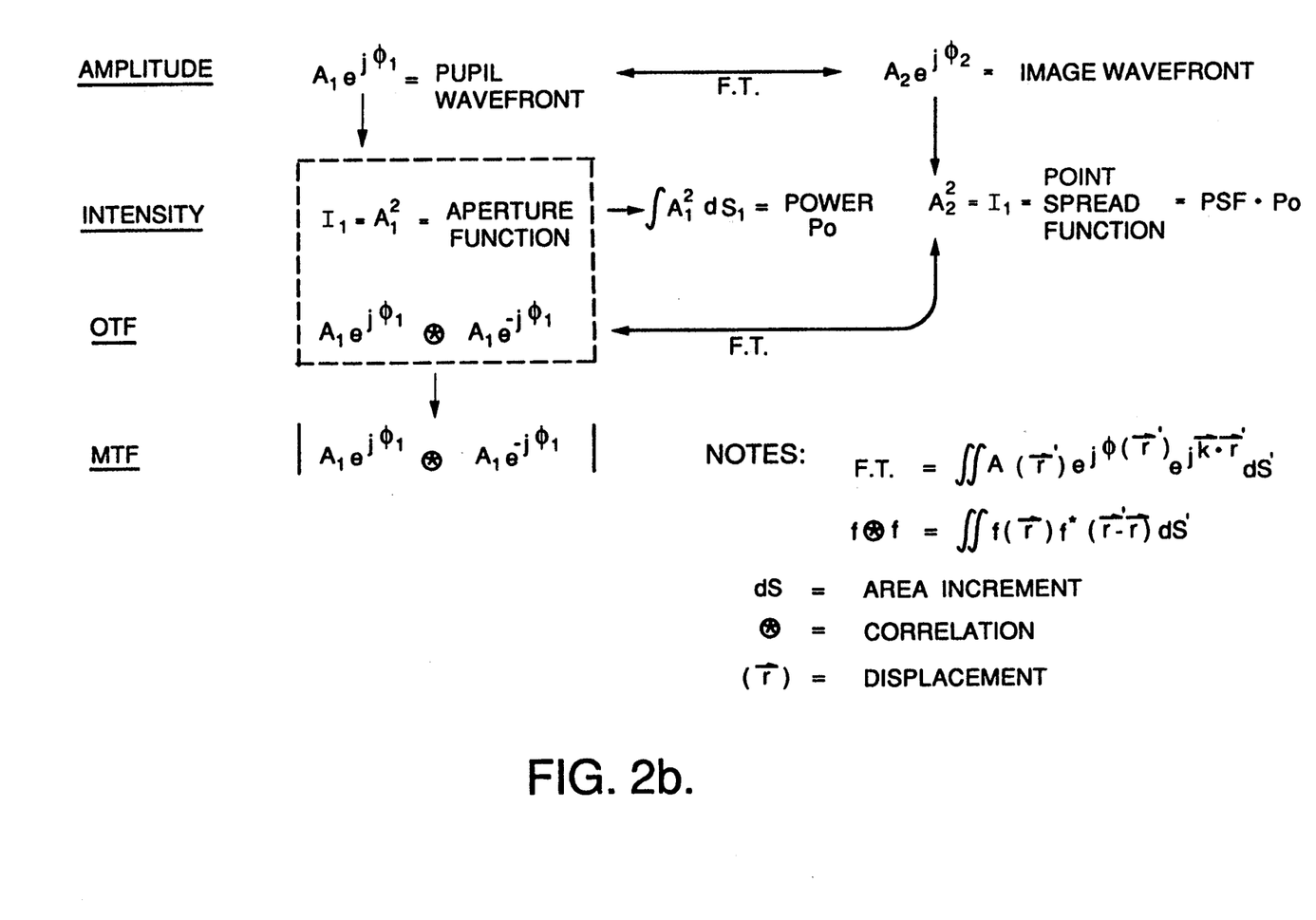
FIG. 2b shows a relationship between wavefronts, intensities, transfer functions, and other optical quantities.

In FIG. 2a there is shown a propagation from a first plane (P1) to a second plane (P2). It is assumed for this discussion that P1 is a pupil and that P2 is an image, but in general P1 and P2 can represent any two planes. The mathematical relationships are shown in FIG. 2b. The two wavefronts, at P1 and at P2, are related by a Fourier Transform (F.T.). More generally, the two wavefronts can also be shown to be related by a Fresnel Transform if P1, P2 are not a pupil/image pair. These transforms describe well-known mathematical relationships that have a unique inverse. Thus, if the wavefront (amplitude and phase) is known in any plane, the wavefront in the other plane can be uniquely determined. By example, the F.T. converts phase information in one plane into intensity and phase variations in the other plane.

In converting from wavefronts to intensities in a given plane, phase information in that plane is lost, but not the phase induced intensity differences from the other plane. The intensity in the pupil is the Aperture Function (AF), which is related to the size and geometric shape of the pupil. The intensity pattern in the image is referred to as a Point Spread Function (PSF) (i.e. an image of a point source spread by diffraction and aberrations in the pupil). The integral of the intensity gives the total power, Po, which must be equal in both P1 and P2 so as not to violate the law of the conservation of energy.

If the inverse Fourier transform of the PSF (image intensity) is taken, the result is referred to as an Optical Transfer Function (OTF). This function can be complex. The magnitude of the OTF is referred to as the Modulation Transfer Function (MTF). The MTF is commonly employed in imaging systems to specify a spatial frequency spectrum passed by the optical system. It is to be noted that both the AF and the OTF are defined in the pupil plane (P1). Together, the AF and the OTF give two equations for solving for two unknowns, that is, the pupil amplitude and the pupil phase. These equations are:

$$\text{Pupil Intensity} = I_1 = A_1^2; \text{ and} \quad (1)$$

$$OTF = F.T.(I_2) = A_1 e^{j\phi_1} \otimes A_1 e^{-j\phi_1}, \quad (2)$$

where $I_1$ and $I_2$ are the pupil and image intensities, respectively.

It should be noted that to solve these two equations both $I_1$ and $I_2$ must be known. This may appear to differ from conventional interferometry, where only one intensity is measured. However, as was pointed out above, interferometry implicitly assumes that the illuminating intensity is uniform. Thus, if it is assumed that $I_1$ is known a priori to be a constant over the aperture only the image intensity $I_2$ need be measured. The assumption of constant illumination is reasonable for most laboratory environments and for space instruments observing stars. For the more general case, where $I_1$ is not constant, both $I_1$ and $I_2$ are measured.

Figure 3:
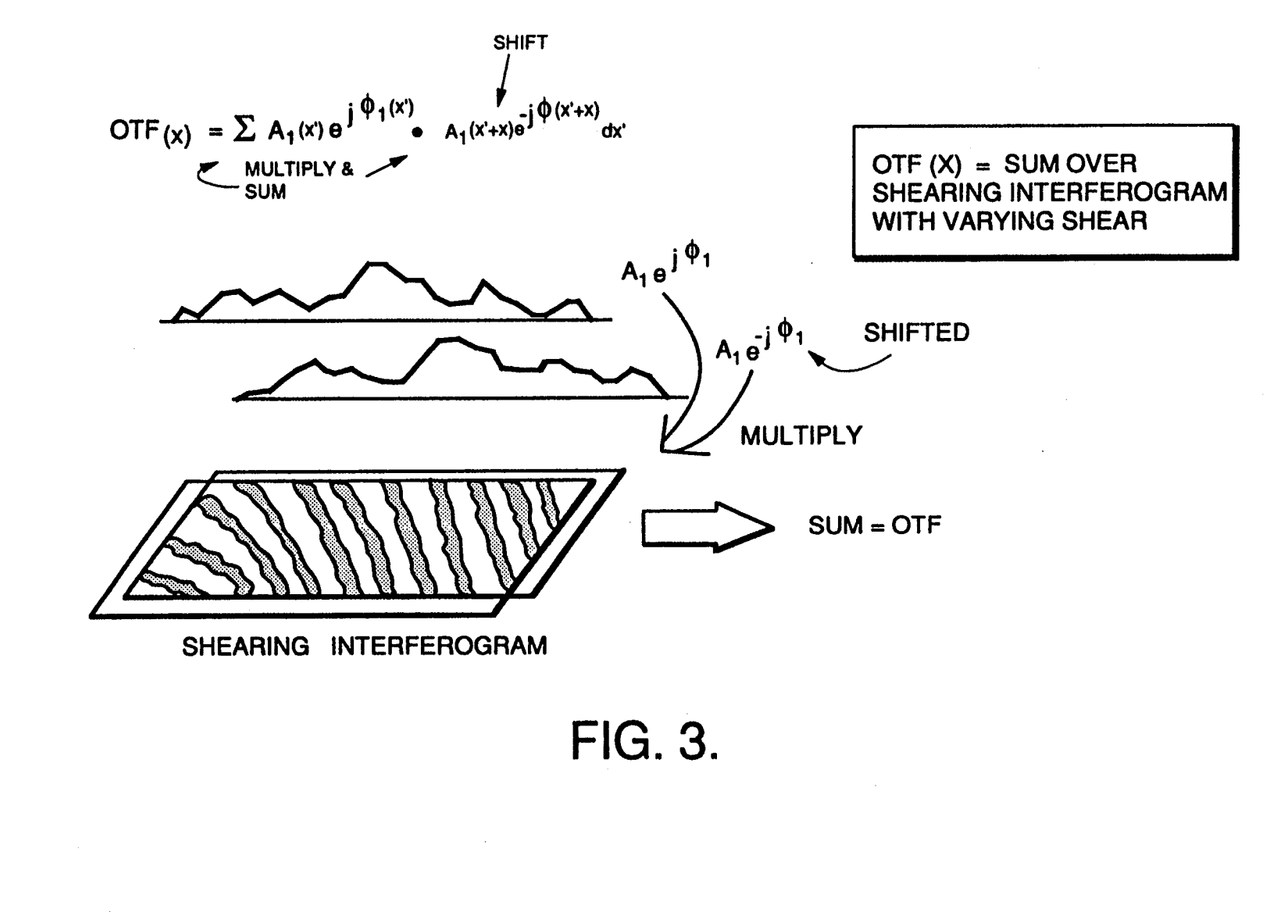
FIG. 3 illustrates the relation of the OTF (Optical Transfer Function) to a shearing interferogram.

The solution to Equation (1) is relatively simple: $A_1$ is taken to be the positive square root of $I_1$. Equation (2) is seen to be an autocorrelation function. That is, the aperture wavefront shifted, complex conjugated, compared to itself, and integrated. As shown in FIG. 3, this can be considered to be a type of shearing interferometry. The OTF is essentially the integrated output of the shearing interferometer as a function of shear. Equation (1) is substituted into Equation (2) a single equation results:

$$OTF = F.T.(I_2) = \sqrt{I_1}\, e^{j\phi_1} \otimes \sqrt{I_1}\, e^{-j\phi_1}, \text{ or} \quad (3)$$

$$OTF(\vec{\tau}) = \int\int dS' \sqrt{I_1(\vec{r})}\, \sqrt{I_1(\vec{r}-\vec{\tau})}\, e^{j[\phi_1(\vec{r})-\phi(\vec{r}-\vec{\tau})]}.$$

As can be seen, Equation (3) involves only (a) the unknown aperture phase and (b) known quantities.

The solution to Equation (3) gives the aperture phase $\phi_1$ and, together with $\sqrt{I_1}$, defines the pupil wavefront.

SWEBIR thus involves methods for solving Equation (3) for the phase in the pupil, based upon the assumed and/or measured values of $I_1$ and $I_2$.

Computational approaches

In accordance with an aspect of the invention there are provided three exact, non-iterative approaches to solving Equation (3). A first approach is an analytic approach, wherein the phase is represented as an analytic function, it being realized that a polynomial function can be related to common optical aberrations if Zernike polynomials are employed. A second approach is a digital approach wherein the phase is sampled at N points and the OTF is sampled at the same points. A third approach is suggested which generalizes the two above mentioned approaches in a systematic manner.

Polynomial approach

Figure 4:
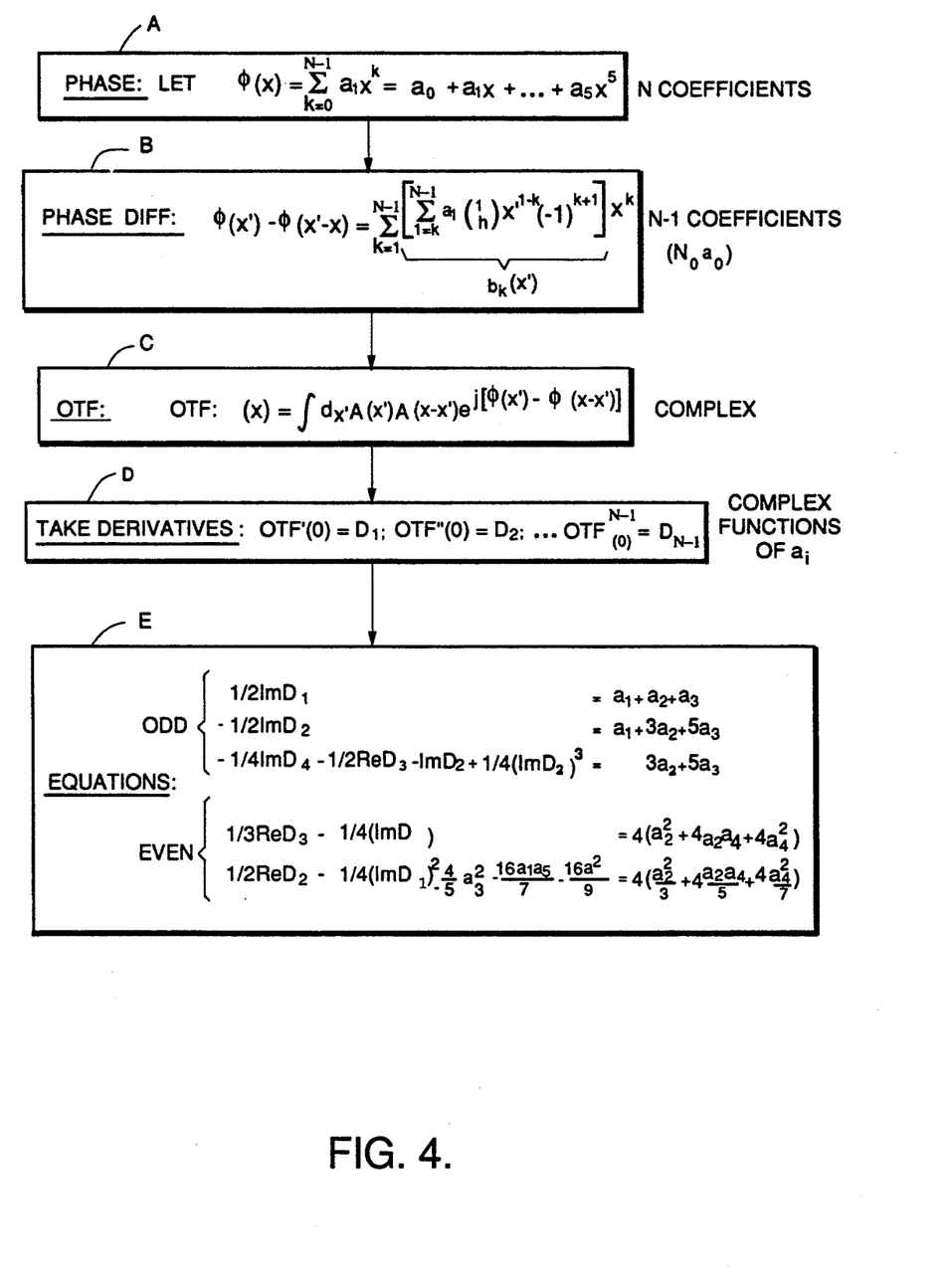
FIG. 4 is a flowchart illustrating the steps of a polynomial expansion technique of the invention for solving for a phase profile of a pupil from known intensities of the image and pupil planes.

FIG. 4 is flow diagram illustrating the polynomial approach for a case where N=6, where the aperture is one-dimensional (slit), and where $I_1=1$. Starting with the given expression for phase in Block A, $\phi$ is expanded as a polynomial expansion of order N−1 with coefficients $a_i$. There are N coefficients, $a_0 \ldots a_{N-1}$, which give N−1 powers, plus a reference piston, or constant, phase $a_0$. In taking phase differences (Block B) $a_0$ cancels, leaving only N−1 coefficients. This expansion is inserted into Equation (3). Next, both sides of Equation (3) are also expanded as a power series (or a polynomial expansion) of order N−1 and the coefficients are equated (Blocks C and D). This provides N−1 equations for the N−1 wavefront coefficients $a_i$. These equations are then manipulated and solved (Block E). After manipulation there are obtained two groups of equations for the odd and even coefficients. The odd coefficients are represented by linear equations and the even coefficients by quadratic equations, as follows:

$$\text{ODD} \quad c_{11}a_i + c_{13}a_3 + c_{15}a_5 + \ldots \quad (4a)$$
$$c_{31}a_i + c_{33}a_3 + c_{35}a_5 + \ldots$$

$$\text{EVEN} \quad c_{222}a_2^2 + c_{224}a_2a_4 + c_{244}a_4^2 + \ldots \quad (4b)$$
$$c_{422}a_2^2 + c_{424}a_2a_4 + c_{444}a_4^2 + \ldots$$

As is seen below for an example solution set for N=6, the linear equations are solved for the odd coefficients and the quadratic equations are solved for the even coefficients.

Odd:
$1/2\, ImD_1 = E_1 = a_1 + a_2 + a_3$
$-1/2\, ImD_2 = E_2 = a_1 + 3a_2 + 5a_3$
$-1/4\, ImD_4 - 1/2\, ReD_3 ImD_2 + 1/4\, (ImD_3)^3 = E_3 = 3a_2 + 5a_3$
$a_1 = E_2 - E_3$
$a_2 = 2E_3 - 5/2(E_2 - E_1)$
$a_3 = 3/2(E_2 - E_1) - E_3$

Even:
$1/4[1/3\, ReD_3 - 1/4\, (ImD_1)^2] = F_1 = a_2^2 + 4a_2a_4 + 4a_4^2$
$1/4\,[-1/2\, ReD_2 - 1/4\, (ImD_1)^2 - 4/5a_3^2 - 16a_1a_5/7 -$
$\qquad 16a_5^2/9] = F_2 = a_2^2/3 + 4a_2a_4/5 + 4a_4^2/7$
$a_2 = \pm 3/4[-F_1 \pm 7/3(10F_2 - F_1)]\; a_4 = 1/2[\pm F_1 - a_2]$
$(a_2 + 2a_4)^2 = F_1$ It can readily be seen from Equation (4b) that since all terms are quadratic forms, there is a sign ambiguity for the first even order term. This is the same result as in interferometry wherein it cannot be determined what side of focus the interferogram represents, because it is not known if the fringes are increasing or decreasing. To establish the sign of the fringes, an arrow is frequently placed on the interferogram or a sign convention is adopted. However, once the sign of the first even coefficient is determined, the signs of all the other even coefficients are uniquely determined by the cross terms.

Figure 5:
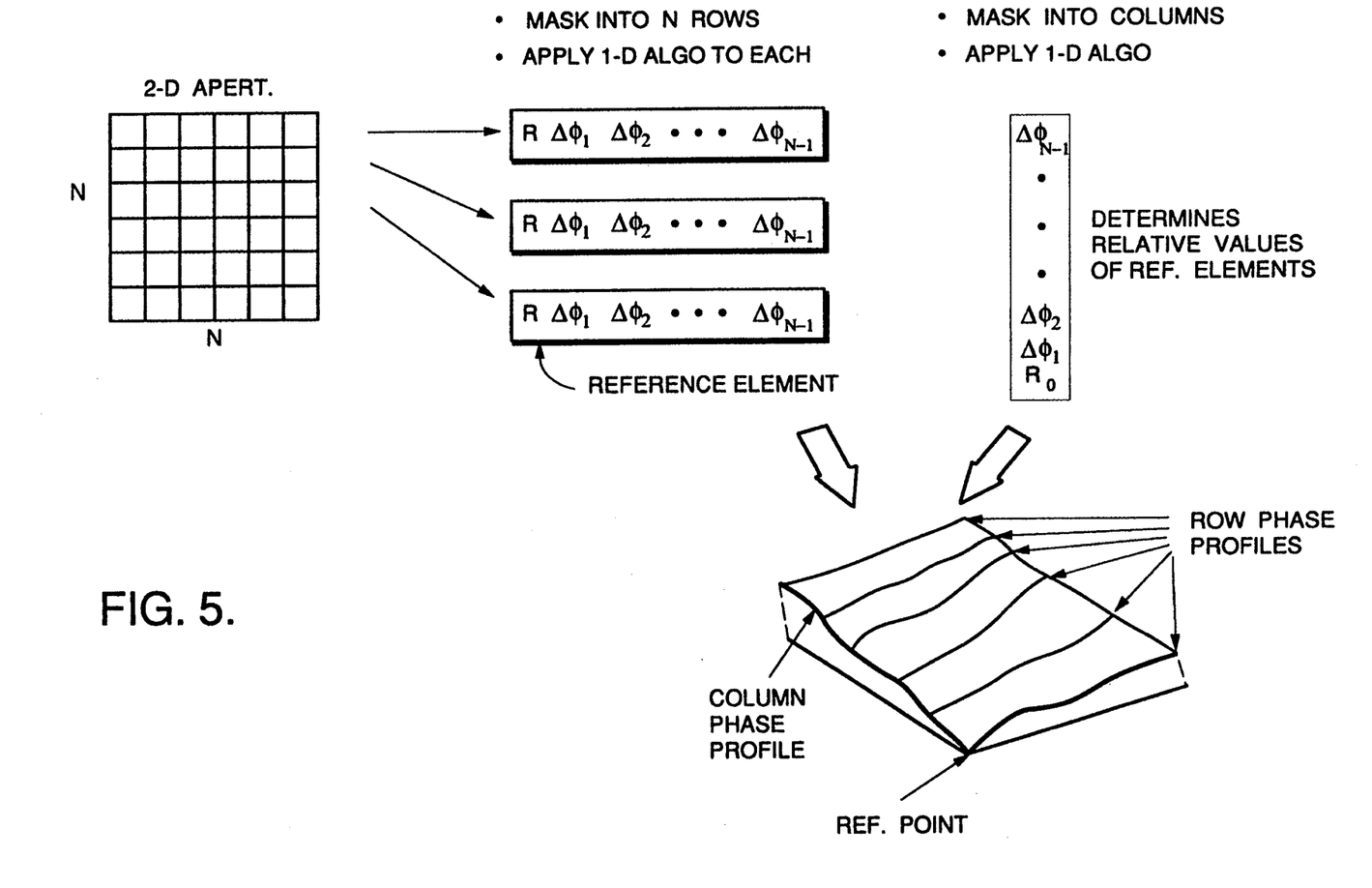
FIG. 5 illustrates an application of a one-dimensional method for solving for a phase profile of a pupil to a two-dimensional aperture.

It is noted that an expansion in a polynomial of degree $N-1$ actually has N coefficients, $a_0 \cdots a_{n-1}$. However, because of the phase differences, $a_0$ cancels out. Therefore, the reference piston phase may be chosen arbitrarily (usually set equal to zero). The one-dimensional approach illustrated in the flowchart of FIG. 4 may also be applied to two-dimensions to determine the wavefront on an $N-1$ by $N-1$ grid, as depicted in FIG. 5. To accomplish the method in two-dimensions the aperture is masked to pass only one row at a time. Each row has $N-1$ data points and is represented by a $(N-1)^{th}$ degree polynomial. The result of applying the method is to determine $N-1$ coefficients for each row. There is also an arbitrary piston phase coefficient for each row, that is undetermined. $N-2$ of the $N-1$ piston coefficients are determined by applying the method to a column. The single undetermined coefficient is the piston phase for the system. Thus, the one dimensional solution illustrated above may be applied to a grid of 25 points to determine 24 phase differences.

A more general two-dimensional solution does not require masking of the pupil, and is discussed below in the subsection entitled "general approach".

In practice, the expansion of the OTF may be accomplished by several techniques. For any given noise spectrum there is an optimum polynomial expansion of Equation 3, and it is the derivatives of these polynomials that are used by the polynomial approach. Other techniques are possible which do not explicitly involve derivatives, but the resulting equation sets (Equations (4a) and (4b)) are similar. A noise analysis indicates that the noise sensitivity in SWEBIR and the noise sensitivity in interferometry are essentially equivalent.

Sampling approach

Figure 6A:
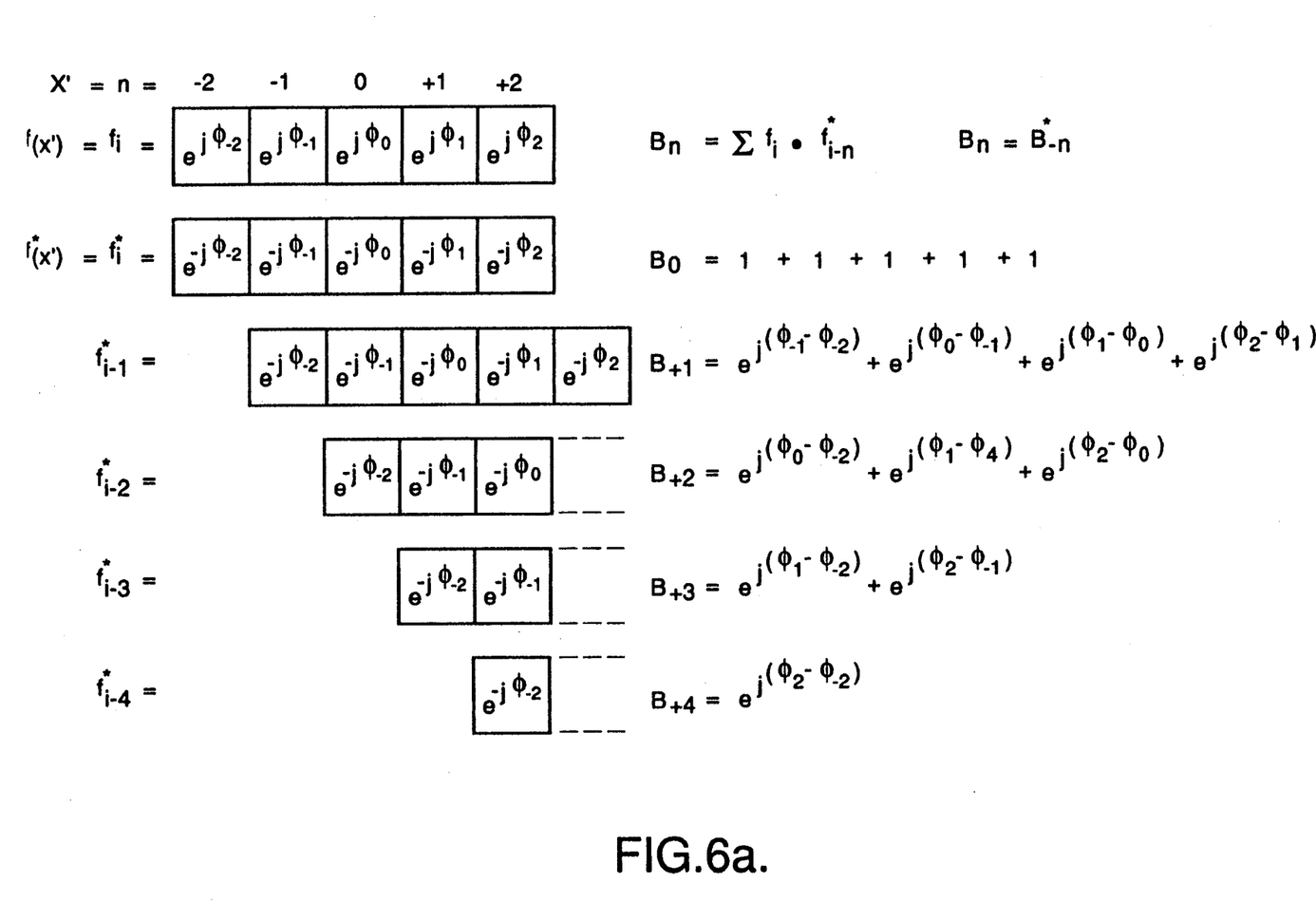
FIG. 6a illustrates the operation of a digital sampling approach to solving for the pupil phase profile for a five element array.
Figure 6B:
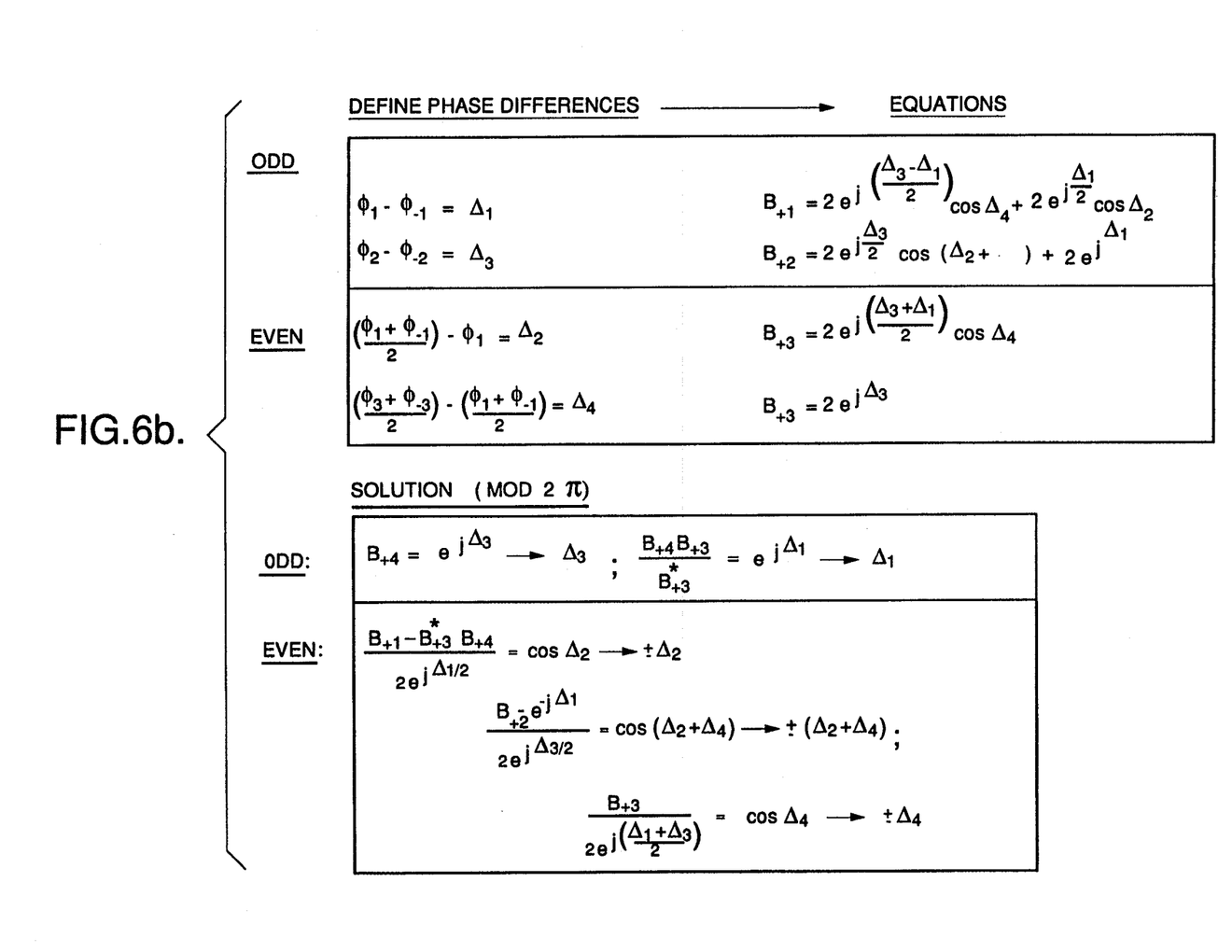
FIG. 6b shows an exact solution for the five element array for odd and even coefficients.

The sampling approach operates to sample the wavefront at N points. At each point the wavefront sample is $A_i e^{j\phi_i}$. This sample is inserted into Equation (3) as depicted in FIG. 6a for a five element array, wherein $a_i = 1$ (uniform amplitude). The results are depicted in FIG. 6b, which illustrates equations of the form (S=shift, $A_i=1$).

ODD (ASYMMETRIC) terms, set $$\phi_K - \phi_{-K} = \Delta_{2K-1} \tag{5a}$$

EVEN (SYMMETRIC) terms, set $$(\phi_K + \phi_{-K})/2 - (\phi_{K-1} = \phi_{-K=1})/2 = \Delta_{2K} \tag{5b}$$

The phase differences involve only antisymmetric (odd) aberrations, while the phase averages involve only symmetric (even) aberrations. It should be noted that the even terms only appear as cosines which have a sign ambiguity, while the odd terms appear only in exponential form. These $N-1$ equations are solved to give $N-1$ phase values, plus one undetermined reference phase (piston). Clearly, it can be seen that the sampling approach exhibits the same properties as the polynomial approach. An example solution for $N-2$ is given in FIG. 6b. If applied to two-dimensions this yields 24 phases, plus one reference, on a 5 by 5 grid (25 points).

In this approach the uniform sampling fixes the sensitivity to noise. To optimize for an arbitrary noise spectrum, non-uniform sampling is employed.

General approach

Each approach discussed above can be extended to an arbitrary number of points in one or two dimensions. However, and as was previously mentioned, the general two-dimensional approach does not require that pupil masking be used for two-dimensions. The general approach solves N equations in $N^2$ unknowns, rather that the simpler case of N sets of N equations in N unknowns. In all cases, the OTF is a function of aperture shape.

It is desirable to provide as general a technique as possible. However, while the technique may be general, the specifics depend upon the aperture shape, noise spectrum, and other constraints (i.e., computational constraints). A common example of a computational constraint is the use of the FFT (Fast Fourier Transform) algorithm, which fixes the grid and introduces aliasing. As another example, the geometry of a selected detector grid also fixes sampling.

Given an aperture shape, noise spectrum and sampling requirements, an optimal set of orthogonal functions is determined in which to expand the OTF. Other sets of functions are then determined in which to expand the phase or wavefront. These functions are desired to be near optimal, computationally efficient, and easily extendable to large N. Because of the non-linear aspect of the problem, a general approach that is valid for all N is selected. The approach is to determine a set of functions which have computationally efficient properties. By example, a phase expansion that is orthogonal over the aperture, and which retains its orthogonally in the OTF equation (Equation (3)), is desirable for computational efficiency. It should be noted that it is also desirable to formulate a generalized set of equations having optimal noise immunity.

Sampling requirements

Figure 7:
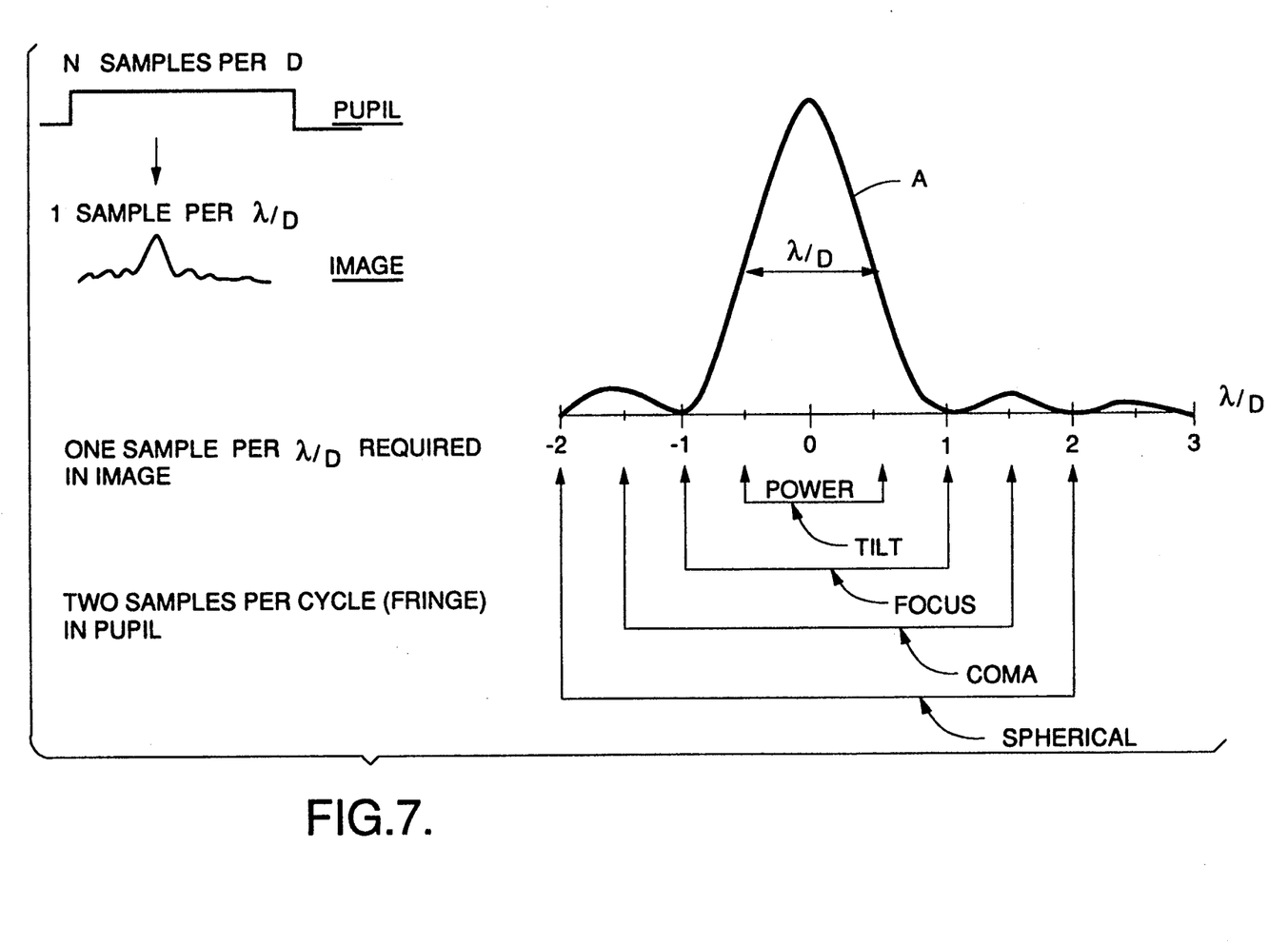
FIG. 7 diagrammatically depicts image sampling requirements.

The SWEBIR technique requires that the image intensity be measured. In accordance with the Nyquist Theorem, at least two samples are required per cycle. Two samples per cycle in the pupil, when transformed into image space, requires two samples per $\lambda/D$, as depicted in FIG. 7. The width of the central image lobe (A) is approximately $\lambda/D$ (3dB width). However, many image systems undersample the image to save detectors. In some instances it is still possible to compute the wavefront from an undersampled image, but the problem is always that undersampling causes aliasing, i.e., any residual higher order aberrations, such as coma and spherical, may contribute to the computed lower order aberrations (tilt and focus). Therefore, adequate sampling is desirable.

Figure 8:
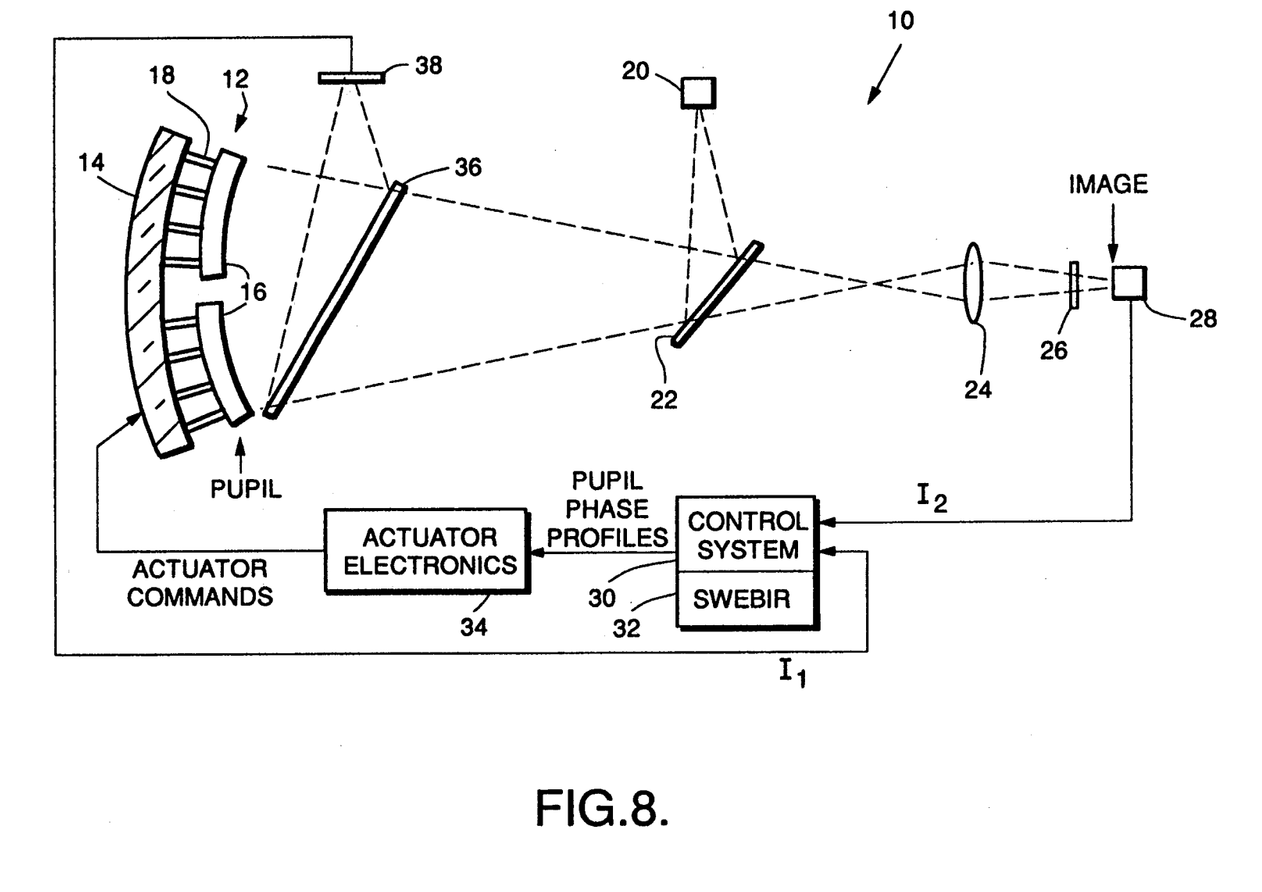
FIG. 8 is a block diagram illustrating a closed loop deformable mirror control system that employs the SWEBIR technique of the invention.

Reference is now made to FIG. 8 which illustrates a controller 10 for a deformable mirror 12. Deformable mirror 12 includes a base 14 and a plurality of mirror sections 16. Mirror sections 16 are connected to the base 14 by a plurality of actuators 18, such as voice coils. A point source 20 provides an output to a beamsplitter 22 which directs radiation from the point source 20 to the deformable mirror 12. The deformable mirror 12 defines the pupil, or aperture, for the system. Radiation reflecting back from the deformable mirror 12 passes through the beamsplitter 22 to a magnifying optic 24 and an optional spectral filter 26. A radiation sensitive surface of a detector 28 defines the image plane of the system. By example, the detector 28 includes a CCD camera. An output of the detector 28 is provided to an actuator control system 30, the actuator control system 30 including a data processor 32 for executing one of the SWEBIR methods of the invention. For the illustrated embodiment the SWEBIR method is the sampling method described in detail above. An output of the control system 30 is provided to actuator electronics 34 which has an output for driving the deformable mirror actuators 18. As can be seen, a closed loop control system is provided wherein the SWEBIR method determines the phase, and hence the aberrations, at the pupil plane. In accordance with the determined aberrations the control system 30 may drive the actuator electronics 34 so as to null out, or minimize, the pupil aberrations. It is also within the scope of the invention to drive the actuators 18 so as to induce a desired aberration at the pupil plane.

In operation, a 1:1 image of the point source 20 is magnified and measured by the detector 28 to acquire a measurement of the PSF. The magnification is chosen such that the image is sampled at least at the Nyquist rate, that is, at a spatial frequency of $\geq 2/N\lambda$, where N is the system f-number. In accordance with the invention, the detector 28 measures the intensity at the image plane. Next, one of the intensity patterns is transformed into the plane of the other. By example, the point image is Fourier transformed to yield the OTF, which has been shown to be the auto-correlation of the complex pupil amplitude with itself. Measurement or inference of pupil intensity provides the amplitude. Equation (3) is then solved, as described above, to provide the phase distribution at the pupil.

For this embodiment, the image at the pupil plane is known a priori. If the intensity at the pupil plane is not known it is within the scope of the invention to provide means, such as a beamsplitter 36 and a separate detector 38, for measuring the wavefront intensity at the plane of the pupil. The output of detector 38 is provided to the control system 30 for use by the SWEBIR method, as described above.

Figure 9:
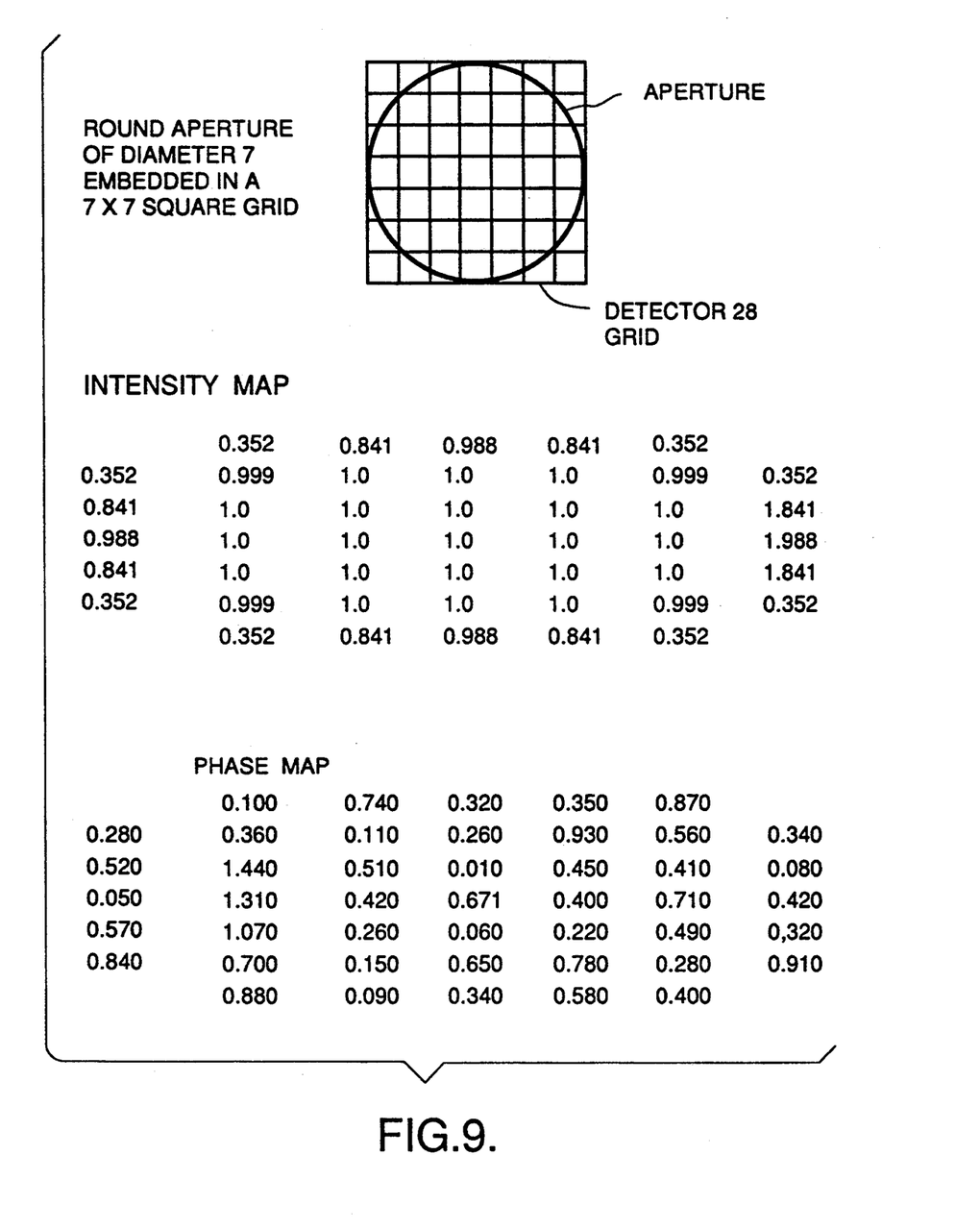
FIG. 9 shows an example of a phase map determined from an intensity map for a round aperture embedded in a square grid.

Referring to FIG. 9, using a 7×7 square pixel grid as an output of the detector 28 and a circular aperture having a radius of 7, the intensity around the edges of the aperture is tapered according to a fraction of the CCD pixel contained within the aperture. Of the 49 total pixels, 45 of the pixels detect some energy and may thus be employed to determine the aperture phases. This arrangement ideally enables 45 Zernike polynomials to be calculated. It is noted that this is more than the number commonly fitted to interferometric data. FIG. 9 also depicts an intensity map corresponding to the 45 pixels that receive energy and further depicts the phase map of the pupil that is computed from the intensity map. In a computer simulation, the computed SWEBIR phase map was found to equal the input phase map to seven decimal places. When the input phases were increased by a factor of 5, the same agreement between the computed and input pupil phase maps was achieved modulo 2 pi. The computational time was found to be less than 0.1 second.

It should be realized that various modifications to the forgoing teaching may be accomplished. By example, it is within the scope of the invention to employ phase masks in the re-imaged pupil to improve accuracy for near-perfect optics. The phase masks change the "interferogram" from a null fringe to a tilted or displaced fringe, providing optimum sensitivity. Various such masks are possible. Examples include, but are not limited to, tilts, defocus, and corner pixels shifted by 90°.

It is also within the scope of the invention to employ various noise reduction techniques. These include, but are not limited to, a technique of adding small errors to the computational methods, linearizing the equations in the errors, and solving the resulting linear equations by regression techniques which minimize the noise. This is preferably accomplished after each row or column computation, such as that illustrated in FIG. 5, but can also be accomplished at the end of the computation. To prevent normally computable numbers from becoming incomputable due to the presence of noise (i.e. cosine>unity), an error bar is employed such that:

| | |
|---|---|
| if cosine < 1 | use cosine |
| $1 + k \geq$ cosine > 1 | cosine = 1 |
| cosine > 1 + k | cosine out of range. |

In summary, it has been shown that the phase of a wavefront at the pupil can be reconstructed from the image, provided the pupil intensity profile is known. As an example, a one-dimensional problem with a uniform aperture (slit) is solved by the use of two techniques: an analytic polynomial expansion technique and a digital sampled technique. Both techniques have been shown to exhibit the same properties, which are identical to those of interferometry. Specifically, the SWEBIR technique of the invention has been shown to exhibit the following characteristics in common with conventional interferometric measurement techniques:

(a) only phase differences are determined;
(b) a sign ambiguity exists for the first even order aberration;
(c) only intensities are measured;
(d) the intensity profile in the aperture is required to be known, and is assumed to be constant or is measured; and
(e) adequate sampling is required, for example, two samples/cycle.

It has also been shown that the one-dimensional technique may be extended to two-dimensions.

The methods of the invention have a number of applications. In optics, by example, SWEBIR can eliminate the need for interferometers. Thus, one may determine the aberrations of a space-based telescope by observing a star and measuring the image (PSF). For ground-based applications atmospheric measurements and compensation can be accomplished by measuring both the pupil and image intensities. SWEBIR may also be employed to measure the curvature of aspherics without a null lens. With known optics, SWEBIR can be employed to construct a scene (including phase) when illuminated with coherent light. One application is the inspection of microcircuits for defects. Other applications include the measurement and correction of phase errors in high frequency side looking radars. In general, any measurement using waves, such as optics, radar, x-rays, acoustics, sonar, and electrons (electron microscopes), in which an intensity is measured and a phase is to be determined, may beneficially employ the teaching of the invention.

Thus, while the invention has been particularly shown and described with respect to a preferred embodiment thereof, it will be understood by those skilled in the art that changes in form and details may be made therein without departing from the scope and spirit of the invention.

What is claimed is:

1. A method for determining a phase profile of a wavefront at a first plane, the wavefront propagating from the first plane to a second plane, comprising the steps of:

providing an intensity of the wavefront at the first plane;

measuring an intensity of the wavefront at the second plane; and determining the phase profile of the wavefront at the first plane in accordance with a transfer function that employs the provided intensity of the wavefront at the first plane and the measured intensity of the wavefront at the second plane.

2. A method as set forth in claim 1 wherein the step of providing includes a step of measuring the intensity of the wavefront at the first plane.

3. A method as set forth in claim 1 and including a step of determining the transfer function by taking an inverse Fourier transformation of the measured intensity at the second plane.

4. A method as set forth in claim 1 wherein the step of providing includes a step of determining the intensity of the wavefront at an aperture of an apparatus that receives the wavefront, and wherein the step of measuring includes a step of measuring the intensity of the wavefront at an image plane of the apparatus.

5. A method as set forth in claim 1 wherein the step of determining includes a step of performing a polynomial expansion, for $N-1$ aberration coefficients, by the steps of:

calculating $N-1$ derivatives of the transfer function;

obtaining $(N-1)/2$ linear equations for odd aberrations;

obtaining $(N-1)/2$ quadratic equations for even coefficients; and solving the equations to determine the phase profile.

6. A method as set forth in claim 1 wherein the step of determining includes a step of sampling the intensity at N points at the second plane, and further includes the steps of:

from the sample intensity, obtaining $(N-1)/2$ equations for odd aberrations;

obtaining $(N-1)/2$ equations for even aberrations;

obtaining $(N/2)-1$ equations to resolve sign ambiguities for the even aberrations; and solving the equations to determine the phase profile.

7. A method as set forth in claim 1 wherein the step of measuring includes a step of operating a wavefront intensity detector to measure the wavefront at a plurality of points.

8. A method as set forth in claim 1 wherein the step of measuring includes a step of operating a wavefront intensity detector to measure the wavefront at a rate equal to or exceeding the Nyquist rate.

9. Apparatus for determining a phase map of a wavefront at a pupil plane, the wavefront propagating from the pupil plane to an image plane, comprising:

first means for measuring an intensity of the wavefront at the image plane; and means, having an input coupled to an output of said measuring means, for determining the phase difference of the wavefront at the pupil plane in accordance with a transfer function that employs a known or measured intensity of the wavefront at the pupil plane and the measured intensity of the wavefront at the image plane.

10. Apparatus as set forth in claim 9 and further including second means for measuring the intensity of the wavefront at the pupil plane, said second measuring means having an output coupled to said determining means for providing the measured intensity thereto.

11. Apparatus as set forth in claim 9 wherein said determining means operates in accordance with a determined optical transfer function obtained by taking an inverse Fourier transformation of the measured intensity at the image plane.

12. Apparatus as set forth in claim 9 wherein said determining means includes data processor means for performing a polynomial expansion, for $N-1$ aberration coefficients, and includes:

means for calculating $N-1$ derivatives of the transfer function;

means for obtaining $(N-1)/2$ linear equations for odd aberrations;

means for obtaining $(N-1)/2$ quadratic equations for even coefficients; and means for solving the equations to determine the phase map.

13. Apparatus as set forth in claim 9 wherein said determining means includes a data processor means for sampling the measure intensity at N points at the image plane, and further includes:

means for obtaining $(N-1)/2$ equations for odd aberrations;

means for obtaining $(N-1)/2$ equations for even aberrations;

means for obtaining $(N/2)-1$ equations to resolve sign ambiguities for the even aberrations; and means for solving the equations to determine the phase map.

14. Apparatus as set forth in claim 9 wherein said measuring means includes a wavefront intensity detector for measuring the wavefront at a plurality of points.

15. Apparatus as set forth in claim 9 wherein said measuring means includes a wavefront intensity detector that measures the wavefront at a rate equal to or exceeding the Nyquist rate.

* * * * *